United States Patent
Vossiek

(10) Patent No.: US 7,594,133 B2
(45) Date of Patent: Sep. 22, 2009

(54) METHOD AND APPARATUS FOR DETERMINING A DEVIATION BETWEEN CLOCK PULSE DEVICES

(75) Inventor: Martin Vossiek, Hildesheim (DE)

(73) Assignee: Symeo GmbH, Munich (DE)

( * ) Notice: Subject to any disclaimer, the term of this patent is extended or adjusted under 35 U.S.C. 154(b) by 247 days.

(21) Appl. No.: 11/578,094

(22) PCT Filed: Mar. 30, 2005

(86) PCT No.: PCT/EP2005/051439

§ 371 (c)(1),
(2), (4) Date: Aug. 14, 2007

(87) PCT Pub. No.: WO2005/098465

PCT Pub. Date: Oct. 20, 2005

(65) Prior Publication Data

US 2008/0292039 A1 Nov. 27, 2008

(30) Foreign Application Priority Data

Apr. 7, 2004 (DE) ........................ 10 2004 017 267

(51) Int. Cl.
*H04Q 7/00* (2006.01)
*H04L 25/00* (2006.01)
(52) U.S. Cl. .................... 713/401; 713/400; 370/252; 370/332; 370/335; 370/336; 370/342; 370/345; 370/350; 455/436; 455/440
(58) Field of Classification Search ............... 713/400, 713/401; 370/252, 332, 335, 336, 342, 345, 370/350; 455/436, 440
See application file for complete search history.

(56) References Cited

U.S. PATENT DOCUMENTS

| 5,519,718 | A | 5/1996 | Yokev et al. |
| 6,031,828 | A * | 2/2000 | Koro et al. .................. 370/336 |
| 6,628,738 | B1 * | 9/2003 | Peeters et al. ............... 375/371 |
| 6,697,629 | B1 | 2/2004 | Grilli et al. |
| 6,975,877 | B1 * | 12/2005 | Dergun et al. .............. 455/502 |
| 7,295,842 | B2 * | 11/2007 | Yang et al. .................. 455/436 |
| 7,359,356 | B2 * | 4/2008 | Lin et al. .................... 370/332 |
| 2001/0038622 | A1 * | 11/2001 | Kato .......................... 370/350 |
| 2004/0043781 | A1 * | 3/2004 | Lin et al. .................... 455/502 |
| 2005/0030935 | A1 | 2/2005 | Seisenberger et al. |
| 2005/0254466 | A1 * | 11/2005 | Rudolf et al. ............... 370/335 |
| 2007/0081514 | A1 * | 4/2007 | Shirokura et al. ........... 370/350 |
| 2007/0140209 | A1 * | 6/2007 | Hebsgaard et al. ......... 370/345 |

FOREIGN PATENT DOCUMENTS

DE   101 57 931 A1   6/2003
FR   2 855 881 A1   12/2004

* cited by examiner

*Primary Examiner*—Abdelmoniem Elamin
(74) *Attorney, Agent, or Firm*—Drinker Biddle & Reath LLP

(57) ABSTRACT

The invention relates to a method for synchronizing clock pulse devices. According to this method, an emission unit emits at least one narrow-band distant signal; clock pulse devices of receiving units are pre-synchronized by coupling the same to the source of one such distant signal; the emission unit emits a wide-band measured signal after a defined waiting time, and the receiving units receive said signal; and the receiving units correlate the wide-band measuring signal with a homogeneously modulated comparison signal, the receiving time of the wide-band measuring signal and the deviation in the synchronization of the clock pulse devices being determined and compensated on the basis of the correlation result.

19 Claims, 2 Drawing Sheets

METHOD AND APPARATUS FOR DETERMINING A DEVIATION BETWEEN CLOCK PULSE DEVICES

BACKGROUND

The invention concerns a method for synchronization of clock pulse devices, in particular for the purpose of a precise position determination of an object in a radio-based positioning system.

Measurement methods which are based on the TDOA ("Time Difference of Arrival") principle are known according to FIG. 1. A transponder T to be localized thereby repeatedly emits a transponder signal $T_S$ at certain points in time. This transponder signal $T_S$ is then received at multiple M base stations whose positions are fixed and known. The M base stations $BS_1$, $BS_2$, . . . , $BS_M$ possess means to precisely determine the arrival point in time of the transponder signal $T_S$. For calculation of the position of the transponder T, the delay difference $t_1-t_2$, $t_1-t_3$ or $t_2-t_3$ of the transponder signal $T_S$ between the transponder T and at least two base stations $BS_1$ and $BS_M$ is evaluated. In order to be able to precisely measure the delay differences, it is necessary to let the clock pulse sources of the base stations BS to run synchronously among one another. For this, either a very elaborate real-time capable background network or highly-precise, long-term stable clocks is required.

Coded signals are typically used as a transponder signal $T_S$, and the determination of the arrival point in time of the signal $T_S$ at the base stations BS ensues via a correlation with a signal known to the base station BS. Such a correlation is, however, very computation-intensive for broadband and radio-frequency signals. If the transponder T and base station BS participating in a measurement are not synchronized, this correlation must ensue continuously and in a real-time capable manner in each base station. This is, at present, only economically realizable for a limited bandwidth with digital circuits.

A method for synchronization of a transmitter station and a receiver station that communicate with one another via a radio interface is known from German Patent Document DE 101 57 931 A1 ("DE '931"), that discloses a system in which, in the transmitter station, a transmission signal is generated with a signal source and emitted via the radio interface and a corresponding reception signal is received in the receiver station by the radio interface and is evaluated using a receiver signal source signal from a signal source on the receiver side that is adapted to the sender-side signal source.

For up-to-date adaptation of the synchronization between a transmission signal and a reception signal, similar modulations are applied to the transmission signal and the reception signal and both are intermixed with one another. The mixed signal is subsequently analyzed with regard to a frequency detuning.

SUMMARY

The invention is based on the object to provide a method and/or an arrangement in which signals can be synchronized among one another such that a precise position determination of a radio station is ensured via the calculation of delay differences of these signals from one radio station and a plurality of others.

The object is achieved via a method for synchronizing clock pulse devices, comprising: emitting, by a transmitter unit, at least one narrow-band pre-signal; pre-synchronizing clock pulse devices of receiver units to a source of the pre-signal via a coupling to such a pre-signal; emitting, by the transmitter unit, a broadband measurement signal after a specific wait time and receiving, by the receiver units, this signal; and correlating, by the receiver units, the broadband measurement signal with a similarly modulated comparison signal and, based on a correlation result, determining a reception point in time of the broadband measurement signal and a deviation of the synchronization of the clock pulse devices and this is compensated.

As a solution, according to an embodiment of the invention, a method for synchronization of clock pulse devices is proposed in which:

a transmitter unit emits at least one narrow-band pre-signal, clock pulse devices are pre-synchronized to the source of the pre-signal via a coupling to such a pre-signal, the transmitter unit emits a broadband signal after a specific wait time and the receiver units receive this signal, the receiver units correlate the broadband measurement signal with a similarly modulated comparison signal and, based on the correlation result, the deviation of the synchronization of the clock pulse devices is determined and compensated.

The clock pulse devices can also be designated as clocks. If a synchronicity of the clocks exists, a majority of the computation effort for determination of the arrival point in time of a signal whose original position is not known can be assumed by simple analog circuit elements. Since the synchronization ensues via radio communications, advantageously, no network cabling among the transmitter units and receiver units is necessary.

Base stations can be used as receiver units and transponders whose position is measured can be used as transmitter units. The transponder can be realized merely as a transmitter unit which itself receives no signal. Advantageously, only the base stations are synchronized among one another since these normally also have the possibility to receive clocked signals.

For position determination of the transmitter unit, according to an embodiment of the invention, a method is provided in which a method for synchronization of clock pulse devices is executed as above, and the arrival point in time of the broadband measurement signal is calculated based on the correlation result and the position of the transmitter unit can be determined via a comparison of the delays of the measurement signal received by the receiver units and transmitted by the transmitter unit.

The method can be expanded in that a reference station with its own clock pulse source (the position of which reference station is known) emits a reference signal. This is received by the receiver units and the clock pulse devices of the receiver units synchronized on this reference signal. The reference station is advantageously fashioned as a transmitter unit in the form of a reference transponder.

However, not only the receiver units but, rather advantageously, also the transmitter unit, can be synchronized from the reference transponder. For this, the transmitter unit must also be expanded as a receiver unit. Advantageously, this results in the base stations knowing at which point in time each transmitter unit transmits due to the coupling between the reference transponder and the transmitter unit or, respectively, transponder. The initial type of cited correlation in real time is therewith no longer necessary. The base stations can naturally likewise also serve as transmitter units, such that they can communicate among one another and, if applicable, pre-synchronize among one another.

A radio communication arrangement can form the basis of and embodiment of the inventive method, which radio communication arrangement comprises:

- a transmitter unit and a plurality of transmitter and receiver units which respectively comprise a clock pulse device, a signal source and a radio interface,
- a reference station whose position is known and which comprises a clock pulse device and a signal source via which reference signals of a predeterminable clock can be generated, whereby,
- a synchronization of the clock pulse devices of the transmitter and receiver units can be achieved in that the delay differences of the reference signals that are to be expected are known to the plurality of transmitter and receiver units due to the known position of the reference station, and thus
- the clock pulse devices of the transmitter and receiver units can be offset among one another in a uniform clocked state using a coupling to the clock pulses of the reference signals.

It is advantageous when the radio communication arrangement is realized as a position measurement system or, respectively, as a radio-based positioning system in that distances between the transmitter and receiver units are measured. The position measurement system is advantageously to be used for the measurements of large distances, whereby in this case naturally the transmitter and receiver units exhibit a corresponding distance relative to one another.

DESCRIPTION OF THE DRAWINGS

Advantageous developments of the invention result from the following exemplary embodiments illustrated in the drawings.

DETAILED DESCRIPTION OF THE PREFERRED EMBODIMENTS

Figure 1:
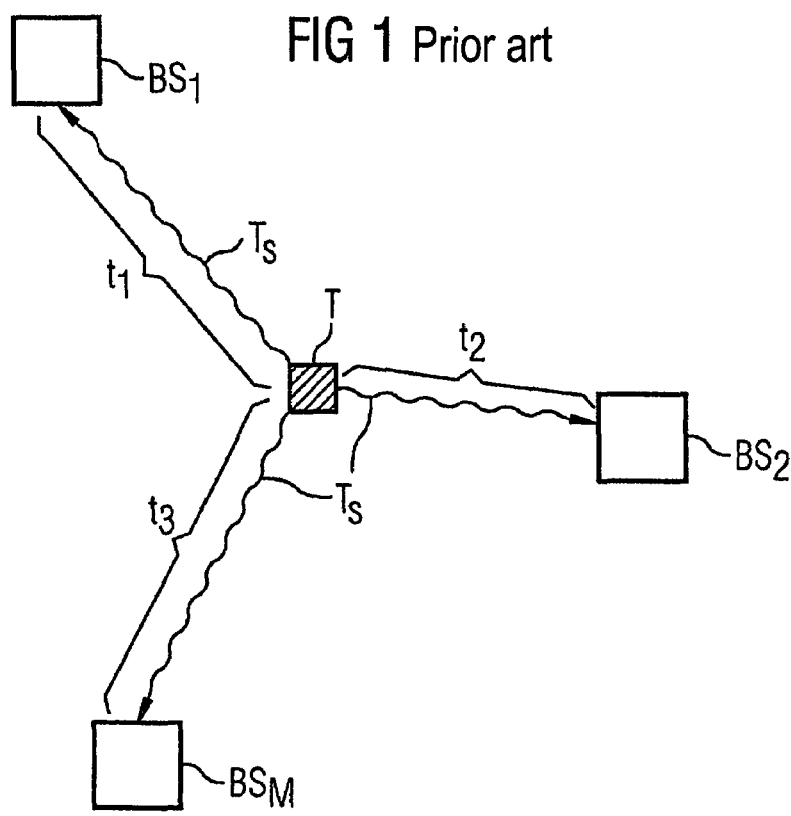
FIG. 1 is a block diagram illustrating a known radio communication arrangement with base stations and a transponder.
Figure 2:
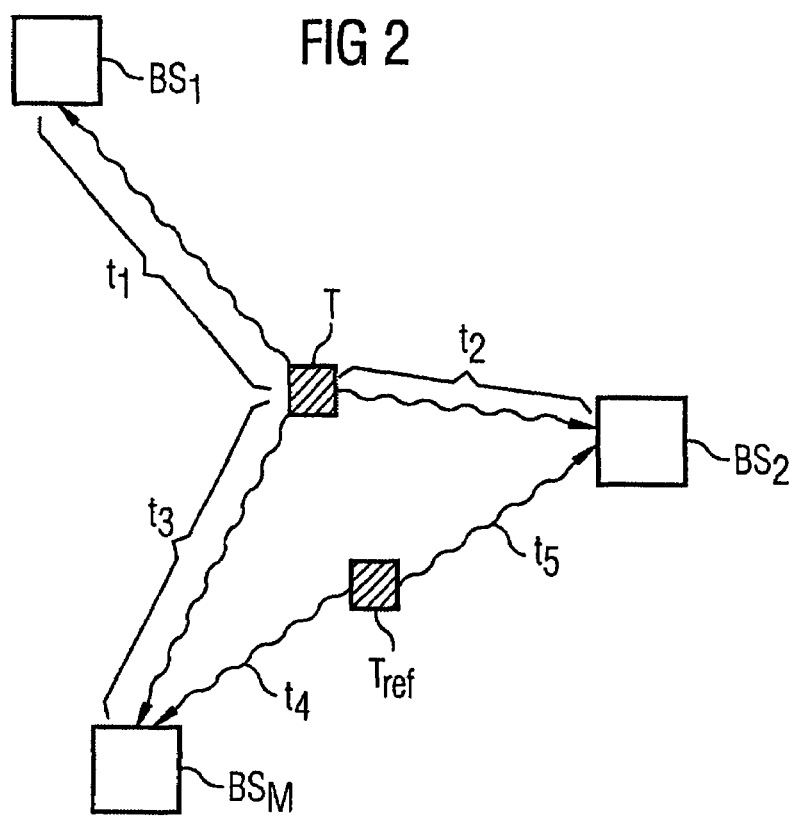
FIG. 2 is a block diagram illustrating a radio communication arrangement with base stations, a transponder and a reference transponder.

FIG. 2 shows how a reference transponder $T_{Ref}$ is prepared at a known position. The base stations $BS_{1-M}$ are advantageously synchronized among one another with the aid of the arrangements and method described in DE '931. For the devices which are used in this method from DE '931, reference is made to FIG. 4. In this method, a transmitter station or, respectively, transponder SE, and a receiver station or, respectively, base station BS, are assumed to communicate with one another via an interface. In this arrangement, a transmission signal $sig_1$ is generated in the transmitter station with a signal source $Sgen_1$, and is emitted via the interface. In the receiver station BS, a corresponding reception signal $esig_1$ is received by the interface and is evaluated using a receiver signal source signal $sig_2$ from a receiver-side signal source $Sgen_2$ adapted to the transmitter-side signal source $Sgen_1$.

The method is characterized in that a similar modulation is applied both to the transmission signal $sig_1$ and to the receiver signal source signal $esig_1$, and the reception signal received in the receiver station BS is mixed with the receiver signal source signal $sig_2$ into a mix signal sigmix, and the mix signal is analyzed. Naturally the base stations BS must also serve as transmitter units for such a communication. After the base stations BS are at least roughly synchronized with one another, the values of the signal delay differences $|t_4-t_5|$ between the reference transponder $T_{ref}$ and a plurality of base stations $BS_{1-M}$ serve to synchronize the base stations more exactly among one another since the position of the reference transponder, and thus also the signal delay differences $|t_4-t_5|$ to be expected, are known. The position of the transponder T can now be precisely determined via the synchronized base stations $BS_{1-M}$ in that delay differences $|t_1-t_2|$ or $|t_2-t_3|$ or $|t_3-t_1|$ of the signal emitted by the transponder T to the base stations BS are evaluated. A triangulation or trilateration method can thereby be used for the position determination of the transponder T.

The reference transponder $T_{ref}$ comprises at least one signal source and a radio interface. It is also provided with a clock pulse source which clocks the signal source. The reference transponder can thus serve as a clock master for all remaining transmitter and receiver units so that the signals originating from these units are synchronized among one another. In order to be able to achieve an even higher precision, a plurality of reference transponders $T_{ref}$ can naturally be used.

A development of the invention exists in that the transponder T to be localized (thus not only the base stations $BS_M$) is also synchronized to a specific clock master, for example, the reference transponder. The transponder signal should thereby be a coded signal, such that at which point in time (relative to the clock of the clock master) each transponder transmits is known to all base stations per se or via a radio data transmission. The very elaborate correlation with this broadband measurement signal no longer has to ensue in a real-time capable manner, but rather can be implemented offline after a data recording. The computational effort or, respectively, the bandwidth of the signal to be evaluated can also be reduced by orders of magnitude via mixing processes as they are described in DE '931 and via evaluation of the mix signal.

Figure 3:
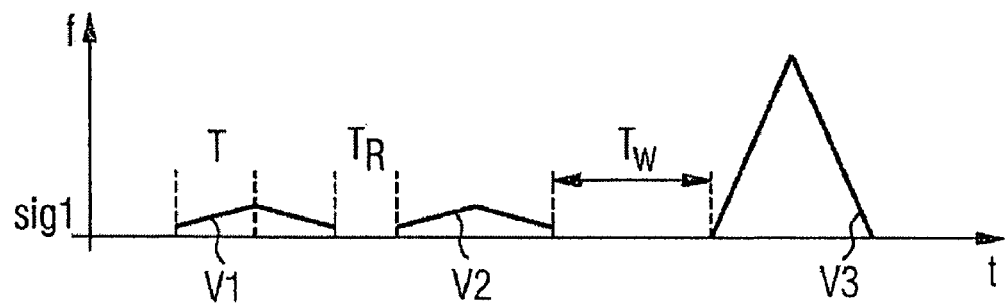
FIG. 3 is a timing diagram illustrating an embodiment for synchronization of clock pulse devices and for position determination of a transmitter unit with successions of pre-signals and measurement signals.

FIG. 3 is a timing diagram showing the course of a series of signals for synchronization of radio stations. In this situation, there is no longer only one special clock master; rather, every transponder, regardless of whether it is a reference transponder or a transponder to be localized, takes on this function as needed. The localization process thereby runs as follows:

Each transponder that would like to initialize a measurement emits an initially very narrow-band pre-signal V1, whereby in FIG. 3, the frequency spectrum or, respectively, the frequency axis is identified with f. In the normal case, all base stations implement a real-time correlation; this should detect this pre-signal V1. Each base station BS that detects such a pre-signal V1 synchronizes to the source of this pre-signal V1 according to the method from DE '931. After a specific wait time $T_w$ known to the base station, the transponder T then sends the actual broadband measurement signal V3.

The pre-signal V1 advantageously also comprises some further information such as identification number of the transponder and specifications about the wait time $T_w$ between pre-signal V1 and measurement signal V3 or also the time duration until the emission of the next signal. In a wholly unsynchronized state, the pre-signal V1 is advantageously repeated slightly time-shifted at least once to increase the assurance of detection of a pre-signal V2. The repetition signal is designated with V2. The wait time $T_r$ should be selected such that it corresponds to approximately half of the modulation duration T of the pre-signal.

A preferred embodiment of the invention exists in that not only are various base stations synchronized to the respective active transponders with the pre-signals V1 and V2, but rather, a reference transponder at a known position also receives the pre-signals V1 and V2 and likewise synchronizes to these pre-signals using these. After a specific wait time $T_w$, the transponder then sends the actual broadband measurement signal V3.

The reference transponder likewise sends a similarly-modulated broadband reference measurement signal RV3 offset by a very small time shift relative to $T_w$. The time offset is selected such that it is distinctly smaller than the length of the broadband measurement signals V3. In the arrangement shown in FIG. 4, both the broadband measurement signal V3 and the broadband reference measurement signal RV3 are then simultaneously mixed with sig2 in the base stations BS. Two signal components—one originating from the transponder and one originating from the reference transponder—are now found in the signal sigmix, using which two signal components the arrival times of and the time difference between the transponder signal and the reference transponder signal RV3 can be determined very exactly in each base station BS. The position of the transponder T can then be determined very well based on the arrival times or, respectively, time differences.

An alternative would be visible in that all participants are synchronized not to a transponder but rather to a reference transponder. The reference transponder would then, for its part, have to provide (via sending of identification signals (addressing specific transponder addresses)) that no more than one transponder emits a measurement signal at the same time.

It is preferred that the position of the transponder to be localized is calculated after various base stations BS have received both the signals of the reference transponder described with respect to FIG. 2 and of the transponder to be localized.

Figure 4:
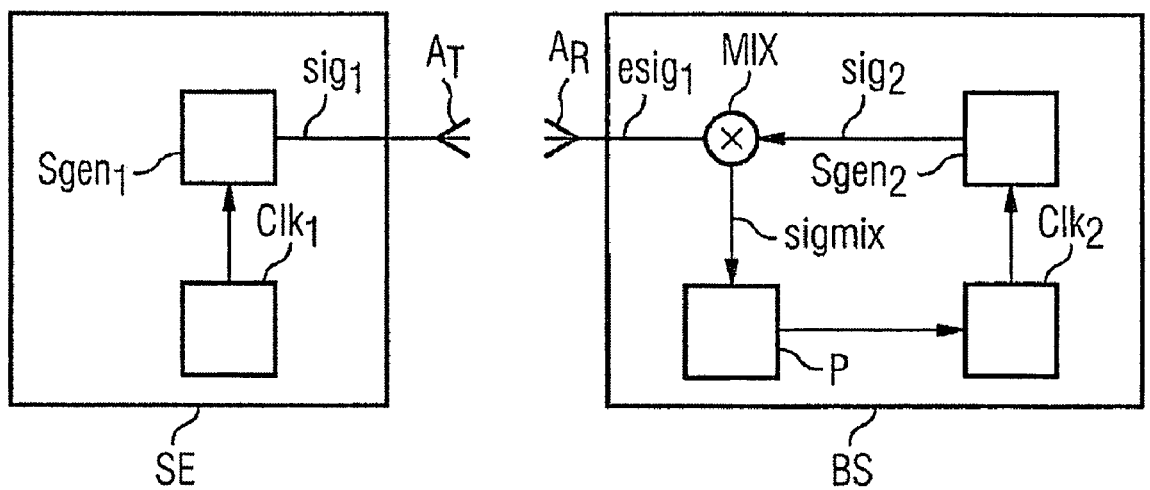
FIG. 4 is a block diagram illustrating a preferred design of transmitter and receiver units.

FIG. 4 shows how a transmitter unit SE sends a transmission signal sig1 via a signal generator $Sgen_1$, which transmission signal $sig_1$ is radiated via the transmission antenna $A_T$ to the base station BS. The form of the signal $sig_1$ is permanently preset. It is advantageous when $sig_1$ is a frequency-modulated signal (for example a FMCW signal). The frequency modulation can ensue linearly, step-by-step, or in digital stages. Such signals are advantageously used as they are also described in DE '931. The base station BS is uniformly designed in large parts. A signal $sig_2$ is generated here in the same manner as in the transmitter unit SE.

The signal received via the antenna $A_R$, which signal was previously generated by the transmitter unit SE, is mixed with $sig_2$ with a mixer MIX. The mix signal sigmix is supplied to an evaluation and control unit ASE that evaluates the mix signal sigmix.

A further embodiment is to likewise expand the unit previously designated as a transponder with similar receiver mechanism like the base station. After the base station is synchronized (as already described before) using the pre-signals V1 and V2 and has received the actual measurement signal and calculated the arrival point in time and the exact synchronization parameters according to DE '931, the base station now, for its part, generates a response signal (based on the arrival point in time and the synchronization parameters) that is now sent to the transponder after a stipulated time span and is received by this transponder and, as provided before, the arrival point in time of the response signal is calculated.

The response signal has a modulation nearly identical to $sig_1$ and is mixed (as described for the base station or in DE '931) with a modulated signal like $sig_1$ (advantageously, like V3 in FIG. 3), and the arrival point in time is calculated from the remaining signal.

The signal delay, and thus the radio channel length, and thus the separation between base station and transponder, can then be calculated from the time difference between query and response under consideration of the stipulated time span. This advantageously occurs using a generally known rough time of flight (RTOF) method. In typical systems without the synchronization according to the method, this method breaks down in all cases in that two spatially separate systems cannot agree upon exact time spans, in particular not on longer time spans, since their clock bases are not identical. However, a highly-precise compensation of the clocks can ensue via the synchronization.

Since here the actual measurement information (namely, the separation value) is acquired in the transponder, it makes sense to exchange the nomenclature and to name the transponder so expanded as the base station and the base station the transponder. In many applications, it can also be reasonable to hold the expanded transponder stationary and to operate the base station mobile. An advantage of this arrangement is that the direct distances between two stations are measured and not delay differences (thus delays of 3 participants) as in the time difference of arrival (TDOA) principle. This direct delay measurement immanently enables a highest-possible flexibility—for example, even this exchange capability of the functions—and harmonizes in a particular manner with typical communication systems in which the communication also runs normally between only two participants. This method is therefore particularly well suited for apparatus in self-organizing radio networks or in sensor networks.

It is also noted that the cited RTOF arrangement, according to the embodiment, is also very well suited for a transponder or, respectively, RFID (radio frequency identification) systems, since with them, the delay between a base station and a transponder can be determined. If the transponder additionally transmits an identification code, it is thus a clearly-improved identification system since not only the identity but rather also the distance of the object with the specific identity can be determined. This supplementary information can be used very advantageously in the field of automation technology, logistics, or in access or security systems.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A method for determining a deviation between clock pulse devices, comprising:
    emitting, by a transmitter unit, at least one narrow-band pre-signal using a clock pulse device;
    pre-synchronizing clock pulse devices of receiver units to a source of the pre-signal via a coupling to such a pre-signal;
    emitting, by the transmitter unit, a broadband measurement signal after a specific wait time and receiving, by the receiver units, this broadband measurement signal; and
    correlating, by the receiver units, the broadband measurement signal with a similarly modulated comparison signal and, based on a correlation result, determining a reception point in time of the broadband measurement signal and determining a deviation of the synchronization of the clock pulse devices.

2. The method according to claim 1, farther comprising:
    waiting for a specific wait time, and then emitting a further narrowband pre-signal that follows after the emission of a first pre-signal to increase detection assurance, to which narrowband pre-signal the clock pulse devices couple.

3. The method according to claim 2, wherein a time span between the first pre-signal and the further pre-signal corresponds to half of a modulation duration of the first pre-signal.

4. The method according to claim 2, wherein the at least one pre-signal comprises specifications about the wait time until the emission of the broadband measurement signal.

5. The method according to claim 1, wherein the pre-signal comprises specifications about a wait time until the emission of the further pre-signal.

6. The method according to claim 1, wherein the transmitter unit is realized as a transponder and the receiver units are realized as base stations.

7. The method according to claim 1, further comprising:
    providing an identification number of the transmitter unit within the at least one pre-signal.

8. The method according to claim 1, further comprising:
    providing the transmitter unit and receiver units in a radio-based positioning system.

9. The method according to claim 1, further comprising:
    utilizing the method for determining a deviation between clock pulses in a system for determining a position of a transmitter unit;
    calculating an arrival point in time of the broadband measurement signal based on the correlation result and the position of the transmitter unit that can be determined via a comparison of the delays of the measurement signal received by the receiver units and transmitted by the transmitter unit.

10. The method according to claim 9, wherein the comparison of the delays is executed using a TDOA method.

11. The method according to claim 9, further comprising:
    emitting a reference signal with a reference station provided with its own clock source, the position of which reference station is known;
    receiving this reference signal by the receiver units; and
    synchronizing the clock pulse devices of the receiver units on this reference signal.

12. The method according to claim 1, further comprising:
    receiving, by the reference station, the pre-signals of the transmitter unit;
    synchronizing, by the reference station, these pre-signals;
    emitting, by the transmitter unit, the broadband measurement signal after the specific wait time;
    emitting, by the reference station, a similarly modulated broadband reference measurement signal offset by a slight time shift relative to the determined wait time,
    selecting the time offset such that it is distinctly smaller than a length of the broadband measurement signals;
    mixing both the broadband measurement signal and the broadband reference measurement signal with a similarly modulated comparison signal into a mix signal in the receiver units the arrival points in time of the measurement signals; and b) the time difference between the measurement signals using the signal components of the transmitter unit and of the reference station comprised in the correlated mix signal; and
    determining a position of the transmitter unit based on at least one of arrival points in time and time difference.

13. The method according to claim 8, wherein the transmitter unit is suited for reception of signals, flirt her comprising:
    after the synchronization of the receiver units via the pre-signals and via the measurement signal;
    generating, by the receiver units a response signal based on the arrival point in time of the measurement signal;
    transmitting this response signal to the transmitter unit after a stipulated wait time;
    receiving this signal, and calculating an arrival point in time of the response signal is calculated there; and
    calculating, based on the stipulated wait time, the signal delay and thus the separation between the transmitter unit and the receiver.

14. The method according to claim 9, farther comprising:
    after the synchronization of the receiver units via the pre-signals and via the measurement signal;
    generating, by the receiver units a response signal based on the arrival point in time of the measurement signal;
    transmitting this response signal to the transmitter unit after a stipulated wait time;
    receiving this signal, and calculating an arrival point in time of the response signal is calculated there; and calculating, based on the stipulated wait time, the signal delay and thus the separation between the transmitter unit and the receiver.

15. The method according to claim 9, further comprising:
utilizing the transmitter unit and receiver unit for position determination of a transmitter unit in a radio-based positioning system.

16. The method according to claim 1, further comprising:
determining and compensating the deviation of the synchronization of the clock pulse devices.

17. A system for determining a deviation of clock pulse devices, the system comprising:
a transmitter unit configured to emit at least one narrow-band pre-signal, and then to emit a broadband measurement signal after a specific wait time, the transmitter unit configured to use a clock pulse device;
a plurality of receiver units, each receiver unit comprising:
pre-synchronization means for pre-synchronizing the clock pulse devices to the source of the pre-signal via a coupling to the pre-signal;
receiving means for receiving the broadband measurement signal;
correlation means for correlating the broadband measurement signal with a similarly modulated comparison signal; and
determination means for determining, based on the correlation result, the reception point in time of the broadband measurement signal and the deviation of the synchronization of the clock pulse devices.

18. A method at a receiver unit for determining a deviation between clock pulse device, the method comprising:
receiving at least one narrow-band pre-signal transmitted by a transmitter unit, the transmitter unit using a clock pulse device;
pre-synchronizing a clock pulse device of the receiver unit to the source of the pre-signal via a coupling to the pre-signal;
receiving a broadband measurement signal transmitted by the transmitter unit after a specific wait time; and
correlating the broadband measurement signal with a similarly modulated comparison signal and, based on the correlation result, determining the reception point in time of the broadband measurement signal and the deviation of the synchronization of the clock pulse devices.

19. A receiver device for determining a deviation of clock pulse devices, the receiver device comprising:
receiving means for receiving at least one narrow-band pre-signal transmitted by a transmitter unit, and for receiving a broadband measurement signal that has been transmitted by the transmitter unit after a specific wait time, wherein the transmitter unit uses a clock pulse device;
pre-synchronization means for pre-synchronizing the clock pulse devices of the receiver device to the source of the pre-signal via a coupling to the pre-signal;
correlation means for correlating the broadband measurement signal with a similarly modulated comparison signal; and
determination means for determining, based on the correlation result, the reception point in time of the broadband measurement signal and the deviation of the synchronization of the clock pulse devices.

* * * * *

UNITED STATES PATENT AND TRADEMARK OFFICE
CERTIFICATE OF CORRECTION

| | |
|---|---|
| PATENT NO. | : 7,594,133 B2 |
| APPLICATION NO. | : 11/578094 |
| DATED | : September 22, 2009 |
| INVENTOR(S) | : Vossiek |

It is certified that error appears in the above-identified patent and that said Letters Patent is hereby corrected as shown below:

IN THE CLAIMS:

In Claim 13, Column 8, line 45, "flirt her" should read --further--.

Signed and Sealed this

Twenty-fourth Day of November, 2009

David J. Kappos
*Director of the United States Patent and Trademark Office*